(12) United States Patent
Stallmann et al.

(10) Patent No.: US 8,961,913 B2
(45) Date of Patent: Feb. 24, 2015

(54) APPARATUS AND SYSTEM FOR $NO_x$ REDUCTION IN WET FLUE GAS

(71) Applicant: ALSTOM Technology Ltd, Baden (CH)

(72) Inventors: Olaf Stallmann, Essenheim (DE); Gerhard Heinz, Esslingen (DE); Klaus Schnieder, Remseck (DE)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/954,461

(22) Filed: Jul. 30, 2013

(65) Prior Publication Data

US 2013/0315810 A1     Nov. 28, 2013

Related U.S. Application Data

(63) Continuation of application No. PCT/IB2012/000103, filed on Jan. 24, 2012.

(30) Foreign Application Priority Data

Feb. 1, 2011 (EP) .................................. 11152884

(51) Int. Cl.
*B01D 53/56* (2006.01)
*B01D 53/62* (2006.01)
(Continued)

(52) U.S. Cl.
CPC ............ *B01D 53/62* (2013.01); *B01D 53/8625* (2013.01); *B01D 53/005* (2013.01); *B01D 2257/404* (2013.01); *B01D 2257/504* (2013.01); *Y02C 10/04* (2013.01)

USPC ................... 423/210; 423/215.5; 423/243.01; 423/239.1; 423/220; 422/168; 422/169; 422/170; 422/171; 422/177; 422/187

(58) Field of Classification Search
USPC .............. 423/210, 215.5, 243.01, 239.1, 220; 422/168, 169, 170, 171, 177, 187
See application file for complete search history.

(56) References Cited

U.S. PATENT DOCUMENTS

| | | |
|---|---|---|
| 5,743,929 A | 4/1998 | Kapoor et al. |
| 5,925,326 A | 7/1999 | Kapoor et al. |

(Continued)

FOREIGN PATENT DOCUMENTS

| | | |
|---|---|---|
| AT | 385211 | 3/1988 |
| CN | 101874964 A | 11/2010 |

(Continued)

OTHER PUBLICATIONS

Aug. 27, 2013 European Office Action issued in European Application No. 11 152 884.0.

(Continued)

*Primary Examiner* — Timothy Vanoy

(57) ABSTRACT

The present invention relates to a method and a system for cleaning a $CO_2$ rich flue gas stream containing water vapor and $NO_X$ prior to $CO_2$ sequestration. The method and system include heating the flue gas stream to a temperature suitable for selective catalytic reduction (SCR) of $NO_X$ in a flue gas heater, reducing at least some of the $NO_X$ in the heated flue gas stream to $N_2$ by SCR, and removing at least some of the water vapor from the $NO_X$ depleted flue gas stream by adsorption in an adsorption drier.

16 Claims, 3 Drawing Sheets

(51) Int. Cl.
*B01D 53/74* (2006.01)
*B01D 53/86* (2006.01)
*B01D 53/00* (2006.01)

(56) References Cited

U.S. PATENT DOCUMENTS

| | | | |
|---|---|---|---|
| 6,136,283 A | 10/2000 | Stern | |
| 6,299,847 B1 * | 10/2001 | Allen | ............................ 423/237 |
| 7,379,487 B2 | 5/2008 | McDermott et al. | |
| 2006/0018814 A1 | 1/2006 | Shimada et al. | |
| 2009/0013717 A1 | 1/2009 | Darde et al. | |
| 2009/0013868 A1 | 1/2009 | Darde et al. | |
| 2009/0025390 A1 | 1/2009 | Christensen et al. | |
| 2009/0211500 A1 | 8/2009 | Andrus, Jr. et al. | |
| 2010/0024476 A1 | 2/2010 | Shah | |

FOREIGN PATENT DOCUMENTS

| | | | |
|---|---|---|---|
| DE | 3604946 A1 | 7/1986 | |
| DE | 39 09 697 | 9/1990 | |
| DE | 10 2009 017 215 | 10/2010 | |
| KR | 100801265 B1 | 2/2008 | |
| WO | 2009/108065 | 9/2009 | |
| WO | 2009/126607 | 10/2009 | |
| WO | WO 2009/126607 A2 * | 10/2009 | ........... B01D 53/047 |
| WO | 2010/072304 | 7/2010 | |
| WO | 2010/103680 | 9/2010 | |

OTHER PUBLICATIONS

Office action issued from Chinese Patent Office dated Nov. 2, 2014 for CN Application No. 201280016236.3.

* cited by examiner

APPARATUS AND SYSTEM FOR NO$_x$ REDUCTION IN WET FLUE GAS

CROSS-REFERENCE TO RELATED APPLICATIONS

This application claims priority to PCT/IB2012/000103 filed Jan. 24, 2012, which in turn claims priority to European Application 11152884.0 filed Feb. 1, 2011, the contents of which are both hereby incorporated in their entirety.

FIELD OF THE INVENTION

The present invention relates to a method and a system for cleaning a CO$_2$ rich flue gas stream containing water vapor and NO$_X$ prior to CO$_2$ sequestration.

BACKGROUND

In the combustion of a fuel, such as coal, oil, peat, waste, etc., in a combustion plant, such as a power plant, a hot process gas is generated, such process gas containing, among other components, carbon dioxide CO$_2$. With increasing environmental demands various processes for removing carbon dioxide from the process gas have been developed. One such process is the so called oxy-fuel process. In an oxy-fuel process a fuel, such as one of the fuels mentioned above, is combusted in the presence of a nitrogen-lean gas. Oxygen gas, which is provided by an oxygen source, is supplied to a boiler in which the oxygen gas oxidizes the fuel. In the oxy-fuel combustion process a carbon dioxide rich flue gas is produced, which can be treated using various CO$_2$ capture technologies in order to reduce the emission of carbon dioxide into the atmosphere.

CO$_2$ capture often comprises cooling, or compression and cooling, of the flue gas to separate CO$_2$ in liquid or solid form from non-condensable flue gas components, such as N$_2$ and O$_2$.

Prior to CO$_2$ capture, it is generally necessary to clean the carbon dioxide rich flue gas. Gas cleaning operation may generally include removal of dust, sulfur compounds, metals, nitrogen oxides, etc.

In order to prevent ice formation in heat exchangers used in the CO$_2$ capture process, wet flue gas must also be dried before being subjected to cooling. In order to achieve the desired dryness of the flue gas, an adsorption drier may be employed. The adsorption drier uses an adsorbent, such as molecular sieves, to efficiently remove water from the flue gas. A problem with many adsorption driers is that the adsorbent, such as molecular sieves, may be sensitive to acid degradation by acids formed by acid gases and water adsorbed by the adsorbent. Such acid degradation may seriously reduce the effective life span of the adsorbent.

Selective catalytic reduction (SCR) is a means of converting nitrogen oxides, also referred to as NO$_X$, with the aid of a catalyst into diatomic nitrogen, N$_2$, and water, H$_2$O. A gaseous reductant, typically anhydrous ammonia, aqueous ammonia or urea, is added to a stream of flue or exhaust gas and is adsorbed onto a catalyst. The NO$_X$ reduction reaction takes place as the gases pass through the catalyst chamber. Before entering the catalyst chamber the ammonia, or other reductant, is injected and mixed with the gases. The SCR reaction is typically performed at a temperature in the range of 200° C. to 500° C. The minimum effective temperature depends, e.g., on the gas constituents and catalyst geometry. SCR catalysts are manufactured from various ceramic materials used as a carrier, such as titanium oxide, and active catalytic components are usually either oxides of base metals (such as vanadium and tungsten), zeolites, and/or various precious metals. Each catalyst component has advantages and disadvantages.

A problem with SCR is that the catalyst may become clogged by incoming soot, fly ashes and other particulate materials, such as metals. This clogging may reduce the efficiency and effective life span of the SCR catalyst.

SUMMARY

An object of the present invention is to provide a method and system for cleaning a carbon dioxide rich gas generated in a boiler combusting a fuel in the presence of a gas containing oxygen, the method alleviating at least one of the above mentioned problems.

Selective catalytic reduction (SCR) requires high temperatures, for example in the range of 190 to 500° C., in order to be effective. For this reason the SCR step, when present in prior art gas treatment systems, is generally performed in direct connection, or shortly after, the combustion step, where the flue gas stream is already present at high temperature. In practice, this means that the SCR step is performed prior to the flue gas condensation (FGC) step where the flue gas is cooled below its water dew point and the heat released by the resulting condensation is recovered as low temperature heat. Generally, the SCR step is also performed prior to the conventional dust removal, e.g. electrostatic precipitation, and sulfur removal steps performed on the flue gas directly downstream of the boiler.

In the gas cleaning methods and systems proposed herein, the SCR step is instead performed on the cool flue gas stream further downstream of the boiler and involves heating the flue gas stream to a temperature suitable for SCR.

According to aspects illustrated herein, there is provided a method of cleaning a CO$_2$ rich flue gas stream containing water vapor and NO$_X$ prior to CO$_2$ sequestration, said method comprising:

heating the flue gas stream to a temperature suitable for selective catalytic reduction (SCR) of NO$_X$;

reducing at least some of the NO$_X$ in the heated flue gas stream to N$_2$ by SCR; and removing at least some of the water vapor from the NO$_X$ depleted flue gas stream by adsorption in an adsorption drier.

According to embodiments of the gas cleaning methods and systems proposed herein, the SCR step is performed downstream of the dust removal and sulfur removal steps or downstream of the flue gas condensation step, which significantly reduces the problems with clogging of the catalyst by incoming soot, fly ashes and other particulate materials, such as metals, thus increasing the life span of the SCR catalyst. It has also been found that performing the SCR step downstream of the FGC allows the size of the SCR reactor to be significantly reduced since only the flue gas surplus is processed. Furthermore, performing the SCR step downstream of the sulfur removal step and/or the FGC means significantly reduced sulfur (e.g. SO$_2$ and SO$_3$) content in the flue gas treated in the SCR-reactor. As a result the operating temperatures of the SCR reactor can be lower, such as in the range of 200° C. to 250° C. In the selective catalytic reduction, water is formed as a product. Before the flue gas can be treated for separation of CO$_2$, e.g. by compression and cooling, it may therefore be necessary to remove at least some of this water from the flue gas, in order to prevent ice formation.

According to an embodiment, the flue gas cleaning method further comprises subjecting the flue gas stream to dust removal prior to heating the flue gas stream.

According to an embodiment, the flue gas cleaning method further comprises subjecting the flue gas stream to sulfur dioxide removal prior to heating the flue gas stream.

According to an embodiment, the flue gas cleaning method further comprises subjecting the flue gas stream to flue gas condensation prior to heating the flue gas stream. Flue gas condensation may significantly reduce the total flue gas flowrate, thus reducing the required size of the SCR and drier units downstream. The flue gas entering the FGC usually contains about 40% by volume of water. After the FGC the flue gas usually contains about 5% by volume of water. A further advantage of the FGC is that wash liquid or slurry, e.g. lime slurry, entrained in the flue gas from the preceding sulfur dioxide removal step is removed during the condensation, thus reducing the problems of fouling and/or clogging of the SCR catalyst and/or gas heater surfaces.

According to an embodiment, the temperature to which the flue gas stream is heated is the range of 190° C. to 500° C.

According to an embodiment, the temperature to which the flue gas stream is heated is the range of 200° C. to 250° C.

According to an embodiment, the heating of the flue gas stream comprises:
pre-heating the flue gas stream to a first temperature by indirect heat-exchange with the flue gas stream resulting from the SCR; and then
super-heating the pre-heated flue gas stream to a second temperature in the range of 190° C. to 500° C.

According to an embodiment, the second temperature is in the range of 200° C. to 250° C.

According to an embodiment, the adsorption drier comprises an adsorbent selected from the group consisting of molecular sieves, zeolite and silica gel.

According to other aspects illustrated herein, there is provided a flue gas treatment system for cleaning a $CO_2$ rich flue gas stream containing water vapor and $NO_X$ prior to $CO_2$ sequestration, said system comprising:
a flue gas heater configured to heat the flue gas stream to a temperature suitable for selective catalytic reduction of $NO_X$;
a selective catalytic reduction reactor (SCR reactor) configured to receive heated flue gas from the flue gas heater and reduce at least some of the $NO_X$ in the heated flue gas stream to $N_2$ by selective catalytic reduction;
an adsorption drier configured to remove at least some of the water from the $NO_X$ depleted flue gas stream by adsorption.

According to an embodiment, the flue gas treatment system comprises a dust removal filter arranged upstream of the flue gas heater.

According to an embodiment, the flue gas treatment system comprises a scrubber for sulfur dioxide removal upstream of the flue gas heater.

According to an embodiment, the flue gas treatment system comprises a flue gas condenser arranged upstream of the flue gas heater.

According to an embodiment, the flue gas heater comprises:
a flue gas pre-heater configured to heat the flue gas stream to a first temperature by indirect heat-exchange with the flue gas stream leaving the SCR reactor; and
a flue gas super-heater configured to heat the pre-heated flue gas stream to a second temperature in the range of 190° C. to 500° C.

According to an embodiment, the second temperature is in the range of 200° C. to 250° C.

According to an embodiment, the adsorption drier comprises an adsorbent selected from the group consisting of molecular sieves, zeolite and silica gel.

The above described and other features are exemplified by the following figures and detailed description. Further objects and features of the present invention will be apparent from the description and the claims.

BRIEF DESCRIPTION OF THE DRAWINGS

Referring now to the figures, which are exemplary embodiments, and wherein the like elements are numbered alike.

DETAILED DESCRIPTION

Figure 1:
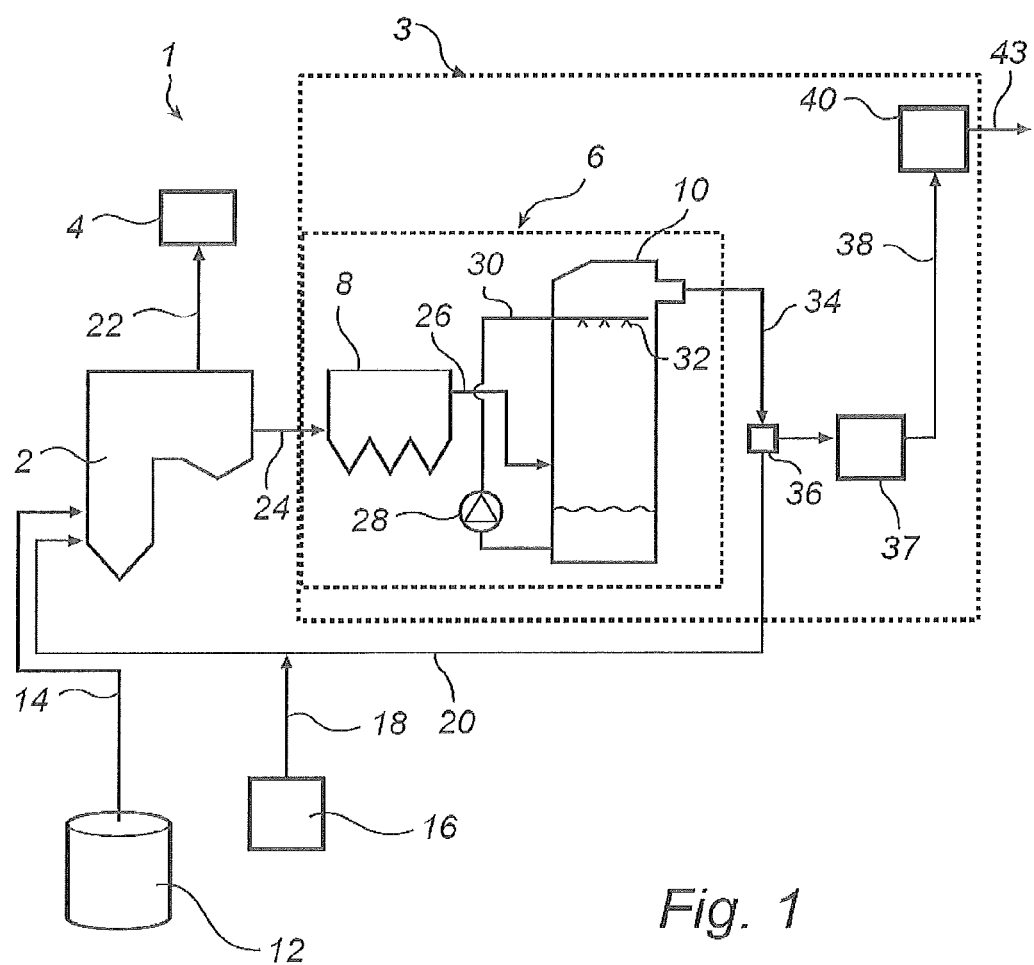
FIG. 1 schematically depicts an embodiment of a gas treatment system.

FIG. 1 is a schematic representation of a boiler system 1, as seen from the side thereof. The boiler system 1 comprises, as main components, a boiler 2, being in this embodiment an oxy-fuel boiler, a steam turbine electric power generation system, schematically indicated as 4, and a flue gas treatment system 3. The flue gas treatment system 3 comprises a flue gas cleaning system 6. The flue gas cleaning system 6 comprises a dust removal device, which may, for example, be a fabric filter or an electrostatic precipitator 8, and a sulfur dioxide removal system, which may be a wet scrubber 10.

A fuel, such as coal, oil, or peat, is contained in a fuel storage 12, and can be supplied to the boiler 2 via a supply pipe 14. An oxygen gas source 16 is operative for providing oxygen gas in a manner which is known per se. The oxygen gas source 16 may be an air separation plant operative for separating oxygen gas from air, an oxygen separating membrane, a storage tank, or any other source for providing oxygen gas to the boiler system 1. A supply duct 18 is operative for forwarding the produced oxygen gas, comprising typically 90-99.9 vol. % oxygen, $O_2$, to the boiler 2. A duct 20 is operative for forwarding recirculated flue gas, which contains carbon dioxide, to the boiler 2. As indicated in FIG. 1, the supply duct 18 joins the duct 20 upstream of the boiler 2, such that oxygen gas and recirculated flue gas, which contains carbon dioxide, may become mixed with each other to form a gas mixture containing typically about 20-50% by volume of oxygen gas, the balance being mainly carbon dioxide and water vapour, upstream of the boiler 2. Since almost no air enters the boiler 2 there is almost no nitrogen gas supplied to the boiler 2. In practical operation, less than 3% by volume of the gas volume supplied to the boiler 2 is air, which mainly enters the boiler system 1 as a leakage of air via, for example, the boiler 2 and the gas cleaning system 6. The boiler 2 is operative for combusting the fuel, that is to be supplied via the supply pipe 14, in the presence of the oxygen gas, mixed with the recirculated flue gas, which contains carbon dioxide, that is to be supplied via the duct 20. A steam pipe 22 is operative for forwarding steam, that will be produced in the boiler 2 as a result of the combustion, to the steam turbine electric power generation system 4, which is operative for generating power in the form of electric power.

A duct 24 is operative for forwarding carbon dioxide rich flue gas generated in the boiler 2 to the dust removal device 8. By "carbon dioxide rich flue gas" is meant that the flue gas leaving the boiler 2 via the duct 24 will contain at least 40% by volume of carbon dioxide, $CO_2$. Often more than 50% by volume of the flue gas leaving the boiler 2 will be carbon dioxide. Typically, the flue gas leaving boiler 2 will contain 50-80% by volume of carbon dioxide. The balance of the "carbon dioxide rich flue gas" will be about 15-40% by volume of water vapour ($H_2O$), 2-7% by volume of oxygen ($O_2$), since a slight oxygen excess is often preferred in the boiler 2, and totally about 0-10% by volume of other gases, including mainly nitrogen ($N_2$) and argon (Ar), since some leakage of air can seldom be completely avoided.

The carbon dioxide rich flue gas generated in the boiler 2 may typically comprise contaminants in the form of, for example, dust particles, hydrochloric acid, HCl, nitrous oxides, $NO_X$, sulfur oxides, $SO_X$, and heavy metals, including mercury, Hg, that should be removed, at least partly, from the carbon dioxide rich flue gas prior to disposing of the carbon dioxide.

The dust removal device 8 removes most of the dust particles from the carbon dioxide rich flue gas. A duct 26 is operative for forwarding the carbon dioxide rich flue gas from the fabric filter 8 to the wet scrubber 10 of the gas cleaning system 6. The wet scrubber 10 comprises a circulation pump 28 which is operative for circulating, in a slurry circulation pipe 30, an absorption liquid, comprising for example lime stone, from the bottom of the wet scrubber 10 to a set of nozzles 32 arranged in the upper portion of the wet scrubber 10. The slurry nozzles 32 are operative for finely distributing the absorption liquid in the wet scrubber 10 to achieve good contact between the absorption liquid and the flue gas being forwarded to the wet scrubber 10 via the duct 26 and flowing substantially vertically upwards inside the wet scrubber 10 to effect efficient removal of sulfur dioxide, $SO_2$, and other acid gases from the carbon dioxide rich flue gas.

The boiler system 1 further comprises a flue gas condenser 37 where the flue gas is cooled below its water dew point and the heat released by the resulting condensation is recovered as low temperature heat. The water content of the flue gas may for example be reduced from about 40% by volume in the flue gas fed to the flue gas condenser to about 5% by volume in the flue gas leaving the flue gas condenser. Depending on pH and temperature in the flue gas condenser, the flue gas condensation may also lead to a reduction of sulfur oxides, $SO_X$, in the flue gas. The sulfur oxides are captured in the formed condensate and separated from the flue gas. Furthermore, wash liquid or slurry, e.g. lime slurry, entrained in the flue gas from the preceding sulfur dioxide removal step is removed during the condensation, thus reducing the problems of fouling and/or clogging of the SCR catalyst and/or gas heater surfaces.

The flue gas treatment system 3 of the boiler system 1 further comprises a gas purification system in the form of a gas compression and purification unit (GPU) 40. An at least partly cleaned carbon dioxide rich flue gas leaves the wet scrubber 10 via a duct 34 which forwards the flue gas to a gas splitting point 36, where the at least partly cleaned carbon dioxide rich flue gas is divided into two flows, namely a first flow, which via the duct 20 is recirculated back to the boiler 2, and a second flow, which via the flue gas condenser 37 and duct 38 is forwarded to the gas compression and purification unit (GPU) 40 of the boiler system 1. In the GPU 40 the cleaned carbon dioxide rich flue gas is further cleaned and is compressed for disposal. Compressed carbon dioxide hence leaves the GPU 40 via a duct 43 and is transported away for disposal, which is sometimes referred to as "$CO_2$ sequestration". The first flow, which is recirculated back to the boiler 2 via duct 20, typically comprises 50-75% by volume of the total flow of the partly cleaned carbon dioxide rich flue gas leaving the wet scrubber 10. The second flow, typically comprising 25-50% by volume of the total flow of the partly cleaned carbon dioxide rich flue gas leaving the wet scrubber 10 is, hence, forwarded, via the flue gas condenser 37 and duct 38, to the GPU 40, which will be described in more detail hereinafter.

Figure 2:
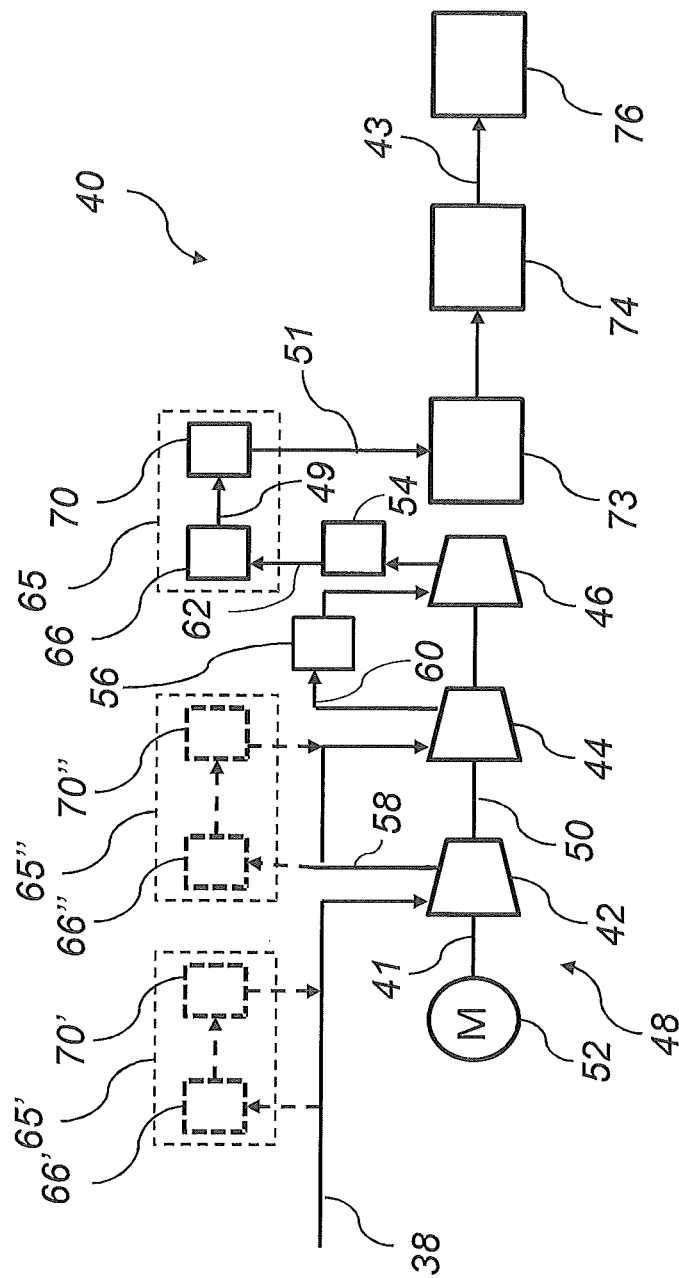
FIG. 2 schematically depicts an embodiment of a GPU.

FIG. 2 illustrates the GPU 40 in more detail. It will be appreciated that the illustration of FIG. 2 is schematic, and that a GPU may comprise further devices for gas purification etc.

The GPU 40 comprises at least one compressor having at least one, and typically two to ten compression stages for compressing the cleaned carbon dioxide rich flue gas. Each compression stage could be arranged as a separate unit. As an alternative, and as illustrated in FIG. 2, several compression stages could be operated by a common drive shaft. The GPU 40 of FIG. 2 comprises a compressor 41 having a first compression stage 42, a second compression stage 44, and a third compression stage 46. The first to third compression stages 42, 44, 46 form together a low pressure compression unit 48 of the GPU 40. The compression stages 42, 44, 46 are connected to a common drive shaft 50 which is driven by a motor 52 of the compressor 41.

Furthermore, the low pressure compression unit 48 may also comprise an intercooling unit 56, downstream of one or more of the compression stages 42, 44, 46. Hence, intercooling units 56 may be arranged downstream of the first, and second compression stages 42, and 44 of the GPU 40 of FIG. 2. One such optional intercooling unit 56 is illustrated downstream of the second compression stage 44. The intercooling unit may further be configured to collect and dispose of any liquid condensate formed during compression and/or cooling.

During compression of the flue gas a reaction may take place that converts sulphur oxides, $SO_X$, with liquid water to their respective acids, using $NO_2$ as a catalyst. The formed acids may then be separated in an intercooling unit 56 arranged downstream of the first, and/or second compression stages. Thus, the low pressure compression unit 48 may contribute to the reduction of $SO_X$ in the flue gas.

The GPU 40 may comprise at least one mercury adsorption unit 54 which is arranged downstream of one of the compression stages 42, 44, 46. In the embodiment of FIG. 2, the mercury adsorption unit 54 is arranged downstream of the third compression stage 46, i.e., downstream of the low pressure compression unit 48. It will be appreciated that the mercury adsorption unit 54 could also have been arranged downstream of the first compression stage 42, or downstream of the second compression stage 44. It is also possible to arrange more than one mercury adsorption unit 54 in the GPU, for example one mercury adsorption unit downstream of the second compression stage 44, and one mercury adsorption unit 54 downstream of the third compression stage 46. The mercury adsorption unit 54 is provided with a packing comprising a mercury adsorbent having affinity for mercury. The adsorbent may, for example, be activated carbon impregnated with sulfur, or another material that is, as such, known for its affinity for mercury. Hence, as the cooled compressed carbon dioxide rich flue gas passes through the packing, at least a portion of the content of mercury of the gas will be adsorbed on the mercury adsorbent of the packing.

Referring to FIG. 2, the cleaned carbon dioxide rich flue gas enters the GPU 40 via the duct 38 and is introduced into the first compression stage 42. A duct 58 forwards, optionally via a not shown intercooling unit, the compressed gas from the first compression stage 42 to the second compression stage 44. A duct 60 forwards, optionally via an intercooling unit 56, the compressed gas from the second compression stage 44 to the third compression stage 46. A duct 62 forwards the compressed gas from the third compression stage 46, via a mercury adsorption unit 54, to the SCR/drier system 65.

The GPU 40 comprises at least one selective catalytic reduction unit (SCR unit) 66. The SCR unit is arranged upstream of the $CO_2$ separation unit 73 and may be arranged upstream or downstream of the low pressure compression unit 48, or between two of the compression stages 42, 44, 46 of the low pressure compression unit 48. In the embodiment of FIG. 2, the SCR unit is arranged downstream of the low pressure compression unit 48. Two alternative arrangements of the SCR unit are also shown in FIG. 2, 66' upstream of the low pressure compression unit 48 and 66" between the compression stages 42 and 44 of the low pressure compression unit 48. Other arrangements of the SCR unit in the GPU 40 upstream of the $CO_2$ separation unit 73 are also possible.

The SCR unit 66, described in detail below with reference to FIG. 3, comprises an SCR reactor 67 having a flue gas inlet 68, a flue gas outlet 69 and a catalyst bed 71 comprising an SCR catalyst. The SCR catalyst may be manufactured from a ceramic material, such as titanium oxide, used as a carrier, and at least one active catalytic component which is usually an oxide of a base metal (such as vanadium or tungsten), a zeolite, or a precious metal. The SCR unit further comprises a reductant supply device for injecting a gaseous reductant, typically anhydrous ammonia, aqueous ammonia or urea, into the flue gas fed to the SCR reactor.

The SCR unit further comprises a flue gas heater configured to heat the flue gas stream to a temperature suitable for selective catalytic reduction of $NO_X$. The flue gas heater may comprise one or more heat exchangers configured to heat the flue gas stream using a suitable heating medium. The heating medium may for example be steam. One heat exchanger of the flue gas heater may be configured to use the flue gas exiting the SCR reactor as the heating medium.

The GPU 40 further comprises an adsorption drier 70, described in detail below with reference to FIG. 3, operative for removing at least a portion of the content of water vapour of the flue gas.

The adsorption drier 70 is arranged downstream of the SCR unit 66, but upstream of the $CO_2$ separation unit 73. As shown in FIG. 2, the adsorption drier 70 may be arranged directly downstream of the SCR unit 66, such that flue gas treated by the SCR unit 66 is directly forwarded to the adsorption drier 70, optionally after suitable cooling of the flue gas stream in a gas cooler 75.

The adsorption drier 70 has a flue gas inlet 77 and a flue gas outlet 78 and contains an adsorbent 79 or desiccant capable of adsorbing water molecules from a gas stream. The adsorbent may be molecular sieves having a pore size suitable for adsorption of water, e.g. molecular sieves having a pore size in the range of 3 to 5 Å.

Figure 3:
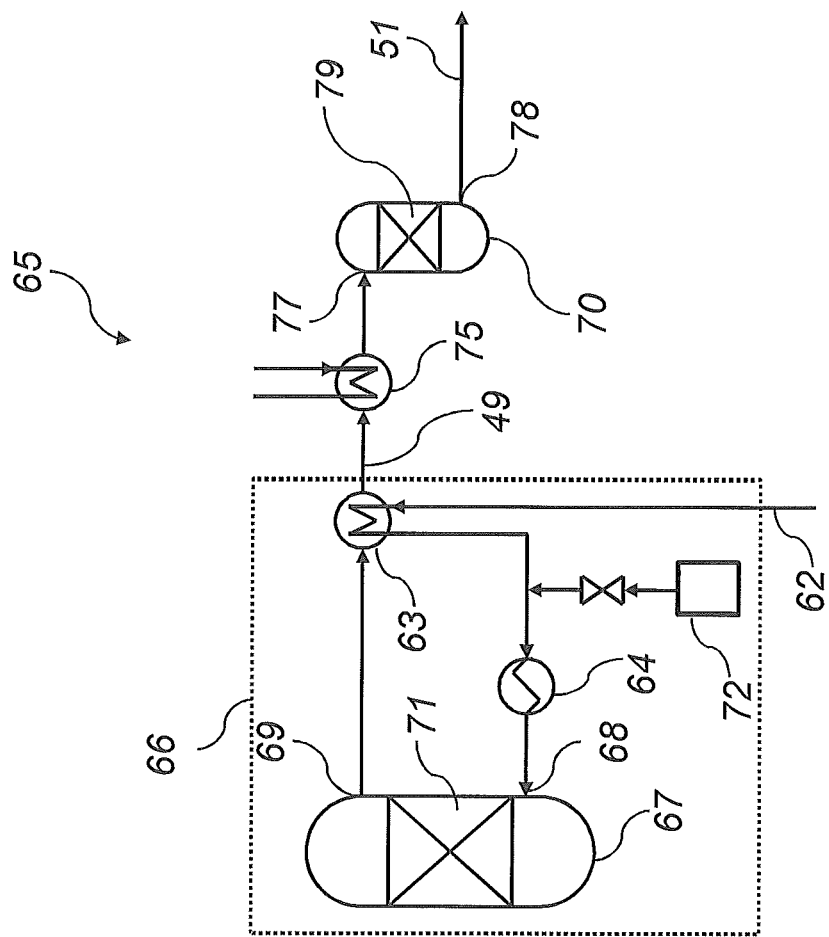
FIG. 3 schematically depicts an embodiment of an SCR/drier system.

The SCR unit 66 and the adsorption drier 70 may be arranged in an SCR/drier system 65 as shown schematically in FIG. 2 and as shown in more detail in FIG. 3.

FIG. 3 describes SCR/drier system 65 more detail. The carbon dioxide rich flue gas which has undergone dust removal, sulfur removal and flue gas condensation enters the SCR unit 66 via the fluidly connected duct 62. Depending on the position of the SCR and drier units with reference to the compression stages of the low pressure compression unit 48, the carbon dioxide rich flue gas may be at essentially atmospheric pressure or at a pressure of 2-55 bar absolute pressure, and, typically, at a temperature of 20 to 70° C. The preferred operation temperature of the SCR reactor is typically in the range of 190° C. to 500° C.

In the SCR unit 66 the flue gas is heated by a flue gas heater 63, 64 to a temperature suitable for selective catalytic reduction of $NO_X$. The flue gas is first heated in a flue gas pre-heater 63 to a first temperature, typically in the range of 100° C. to 250° C. by indirect heat-exchange, in a suitable gas-gas heat exchanger, with the flue gas stream leaving the SCR reactor via gas outlet 69. The pre-heated flue gas is then further heated in a flue gas super-heater 64 to a second temperature in the range of 190° C. to 500° C. The super-heater 64 may employ electrical heating or super-heated steam or other heating medium at a suitable temperature for heating the pre-heated flue gas stream to a temperature in the range of 190° C. to 500° C.

To the flue gas fed to the SCR unit 66 a reductant is added. The reductant may, typically, be anhydrous ammonia, aqueous ammonia or urea. The reductant may for example be added to the flue gas stream via a reductant supply device 72 after pre-heating (as shown in FIG. 3) or after super-heating. Optionally, the reductant may be added to the flue gas stream upstream of the pre-heater 63 or directly to the SCR reactor 67. The reductant, e.g. ammonia, is mixed with the flue gas stream and adsorbed onto the SCR catalyst 71 in the SCR reactor 67. The SCR reactor 67 converts at least some of the $NO_X$ in the heated flue gas stream to $N_2$ by selective catalytic reduction.

The GPU 40 may optionally comprise a flue gas economizer (not shown) arranged between the SCR unit 66 and the adsorption drier 70 and configured to recover heat from the flue gas stream leaving the SCR unit using, e.g. boiler feed water.

The $NO_X$ depleted flue gas stream from the SCR unit 66 is forwarded via the duct 49 to an adsorption drier 70. The adsorption drier 70 is provided with a packing 79 comprising a water vapour adsorbent, also referred to as a desiccant, having affinity for water vapour. The desiccant may, for example, be silica gel, calcium sulfate, calcium chloride, montmorillonite clay, molecular sieves, or another material that is, as such, known for its use as a desiccant. Hence, as the further cooled compressed carbon dioxide rich flue gas passes through the packing 79, at least a portion of the content of water vapour of the gas will be adsorbed on the desiccant of the packing 79.

The compressed gas, from which at least a portion of its $NO_X$ and water content has been removed, is forwarded via a duct 51 from the SCR/drier unit 65 to optional further units of the GPU 40. Examples of such optional further units of the GPU 40 include a non-condensable gas removal unit, for example a $CO_2$ separation unit 73, in which the gas is cooled in a heat-exchanger, often called a cold-box, to cause liquefaction of the carbon dioxide such that the carbon dioxide can be separated from gases, such as nitrogen, that are not liquefied at the same temperature as carbon dioxide.

Furthermore, the GPU 40 may comprise a high pressure compression unit 74 arranged downstream, as seen with respect to the transport direction of the carbon dioxide, of the $CO_2$ separation unit 73, and comprising one or more compression stages for compressing the carbon dioxide to a suitable pressure for sequestration. After compression of the gas in the high pressure compression unit 74, the compressed carbon dioxide, which may be in a supercritical or liquid state, is forwarded, via duct 43, to a $CO_2$ sequestration site 76.

The carbon dioxide rich flue gas, from which at least a portion of its water vapour content has been removed, is forwarded, via fluidly connected duct 51, to the $CO_2$ separation unit 73 and subsequently to the high pressure compression unit 74, as illustrated in FIG. 2. The carbon dioxide rich flue gas forwarded via duct 51 is suitable for further treatment in the $CO_2$ separation unit 73 and the high pressure compression unit 74, and for eventually being sent to carbon dioxide sequestration 76 via duct 43, as illustrated in FIG. 2. For example, a heat exchanger, also called a cold box, of the $CO_2$ separation unit 73 may often be made from aluminium. Residual water may cause formation of ice in the cold box, eventually resulting in problems with reduced cooling capacity and clogging of the heat exchanger. By providing an adsorption drier 70 upstream of the $CO_2$ separation unit 73, such problems are avoided, or at least minimized.

The adsorption drier 70 may be provided with a regeneration and heating system (not shown) for intermittent regeneration of the water vapour adsorption capacity of the adsorption drier 70. A supply duct is arranged for supplying a regeneration gas to the system. The regeneration gas is preferably an inert gas which does not react with the packing of the adsorption drier. Examples of suitable gases include nitrogen or another inert gas that, preferably, holds a low amount of mercury and water vapour. Preferably, inert off gas, usually comprising nitrogen as one of its main constituents, separated from the carbon dioxide in the $CO_2$ separation unit 73 is utilized as regeneration gas. The regeneration system comprises a heater which is adapted for heating the regeneration gas. A heating circuit is connected to the heater for circulating a heating medium, such as steam, in the heater. For regeneration of the material of the packing of the gas drier 70, the heater may typically heat the regeneration gas to a temperature of about 120-300° C. During a regeneration sequence, the heated regeneration gas is supplied to the gas drier 70 from the regeneration and heating system. The regeneration gas heats the material of the packing and causes a desorption of water vapour.

According to one embodiment, the GPU 40 may be provided with two parallel gas driers 70, with one of those parallel gas driers 70 being in operation while the other parallel gas drier 70 undergoes regeneration. According to another embodiment, the carbon dioxide rich flue gas could be emitted to the atmosphere during the regeneration of the packing of the gas drier 70.

It will be appreciated that numerous variants of the embodiments described above are possible within the scope of the appended claims. Particularly, it will be appreciated that the SCR and drier units may be arranged in a number of different positions downstream of the dust removal unit and flue gas condenser, while still upstream of the $CO_2$ separation unit, with reference to the general flow direction of the flue gas stream. In FIG. 2 three possible arrangements of the SCR and drier units in accordance with the present disclosure are presented, (a) downstream of the low pressure compression unit, (b) upstream of the low pressure compression unit, and (c) between two compression stages of the low pressure compression unit.

Hereinbefore it has been described how a gas purification system including an SCR reactor for $NO_X$ removal and an adsorption drier 70 for reduction of the content of water vapour, may be integrated as part of a GPU 40, as illustrated in FIGS. 1-3. It will be appreciated that a gas purification system of this type, and a method of operating it, may also be integrated in other types of processes, where there is a need for removing $NO_X$ and water vapour from a carbon dioxide rich flue gas. Furthermore, the gas purification system of the above mentioned type may also be integrated in other parts of the GPU 40 than those described hereinbefore.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of cleaning a $CO_2$ rich flue gas stream containing water vapor and $NO_X$ prior to $CO_2$ sequestration, said method comprising:
    heating the flue gas stream to a temperature suitable for selective catalytic reduction (SCR) of $NO_X$;
    reducing at least some of the $NO_X$ in the heated flue gas stream to $N_2$ by SCR; and
    removing at least some of the water vapor from the $NO_X$ depleted flue gas stream by adsorption in an adsorption drier.

2. The method according to claim 1, further comprising subjecting the flue gas stream to dust removal prior to heating the flue gas stream.

3. The method according to claim 1, further comprising subjecting the flue gas stream to sulfur dioxide removal prior to heating the flue gas stream.

4. The method according to claim 1, further comprising subjecting the flue gas stream to flue gas condensation prior to heating the flue gas stream.

5. The method according to claim 1, wherein said temperature is the range of 190° C. to 500° C.

6. The method according to claim 1, wherein said temperature is the range of 200° C. to 250° C.

7. The method according to claim 1, wherein said heating comprises:
    pre-heating the flue gas stream to a first temperature by indirect heat-exchange with the flue gas stream resulting from the SCR; and then
    super-heating the pre-heated flue gas stream to a second temperature in the range of 190° C. to 500° C.

8. The method according to claim 7, wherein said second temperature is the range of 200° C. to 250° C.

9. The method according to claim 1 wherein said adsorption drier comprises an adsorbent selected from the group consisting of molecular sieves, zeolite and silica gel.

10. A flue gas treatment system (3) for cleaning a $CO_2$ rich flue gas stream containing water vapor and $NO_X$ prior to $CO_2$ sequestration, said system comprising:
    a flue gas heater configured to heat the flue gas stream to a temperature suitable for selective catalytic reduction of $NO_X$;
    a selective catalytic reduction reactor (SCR reactor) configured to receive heated flue gas from the flue gas heater and reduce at least some of the $NO_X$ in the heated flue gas stream to $N_2$ by selective catalytic reduction;
    an adsorption drier configured to remove at least some of the water from the $NO_X$ depleted flue gas stream by adsorption.

11. The flue gas treatment system according to claim 10, further comprising a dust removal filter arranged upstream of the flue gas heater.

12. The flue gas treatment system according to claim 10 further comprising a scrubber for sulfur dioxide removal upstream of the flue gas heater.

13. The flue gas treatment system according to claim 10 further comprising a flue gas condenser arranged upstream of the flue gas heater.

14. The flue gas treatment system according to claim 10 wherein said flue gas heater comprises:

a flue gas pre-heater configured to heat the flue gas stream to a first temperature by indirect heat-exchange with the flue gas stream leaving the SCR reactor; and a flue gas super-heater configured to heat the pre-heated flue gas stream to a second temperature in the range of 190° C. to 500° C.

15. The flue gas treatment system according to claim 14, wherein said second temperature is in the range of 200° C. to 250° C.

16. The flue gas treatment system according claim 10 wherein said adsorption drier comprises an adsorbent selected from the group consisting of molecular sieves, zeolite and silica gel.

* * * * *